April 30, 1963 G. A. HAMILTON ETAL 3,087,746
HOSE CLAMP WITH SCREW CONNECTED PIVOTALLY
MOUNTED CLAMPING SEGMENTS
Filed July 13, 1960 2 Sheets-Sheet 1

INVENTORS.
GEORGE A. HAMILTON &
RICHARD N. IVERSEN
BY
RICHEY, McNENNY & FARRINGTON
ATTORNEYS

April 30, 1963

G. A. HAMILTON ETAL 3,087,746

HOSE CLAMP WITH SCREW CONNECTED PIVOTALLY
MOUNTED CLAMPING SEGMENTS

Filed July 13, 1960

*INVENTORS.*
GEORGE A. HAMILTON &
RICHARD N. IVERSEN
BY
RICHEY, McNENNY & FARRINGTON

*Donald W. Farrington*

ATTORNEYS

United States Patent Office 3,087,746
Patented Apr. 30, 1963

3,087,746
HOSE CLAMP WITH SCREW CONNECTED PIVOT-
ALLY MOUNTED CLAMPING SEGMENTS
George A. Hamilton, Cleveland, and Richard N. Iversen, Mayfield Heights, Ohio, assignors to The Weatherhead Company, Cleveland, Ohio, a corporation of Ohio
Filed July 13, 1960, Ser. No. 42,536
4 Claims. (Cl. 285—243)

This invention relates to a hose coupling.

Prior to the present invention various hose couplings have been proposed which were made up of a plurality of arcuate clamping segments arranged in succession circumferentially around the outside of the hose and a hollow rigid insert received inside the hose, with the hose being clamped between this insert and the outside clamping segments.

One of the problems connected with the use of such prior hose clamps has been the difficulty of holding all the parts in proper position during the assembly of the clamp onto the hose. This is an especially serious problem where the hose is of large diameter. Another problem has been the difficulty of positioning the outside clamping segments in an even distribution circumferentially around the hose. Also, such prior clamps have shown a tendency to tear the hose when there was high pressure inside the hose and/or a substantial lengthwise tensile force on the hose.

The present invention is directed to a novel hose clamp which effectively solves all of these problems and which is especially advantageous for use on large diameter hoses.

Accordingly, it is an object of this invention to provide a novel and improved hose clamp.

Another object of this invention is to provide such a hose clamp which is especially adapted for large diameter hoses.

Another object of this invention is to provide such a hose clamp which can be more easily manipulated during its attachment to the hose without the likelihood of improperly positioning any of the parts.

Another object of this invention is to provide such a hose clamp which, during its attachment to or detachment from the hose, can be handled as only two units.

Another object of this invention is to provide a novel hose clamp of the segmental type which has the clamping segments uniformly distributed around the circumference of the hose in a positive manner.

A further object of this invention is to provide such a hose clamp which has a highly effective gripping action against the hose in response to high internal pressure in the hose or a lengthwise tensile force on the hose without, however, having any substantial tendency to tear the hose under such conditions.

Further objects and advantages of this invention will be apparent from the following detailed description of a presently-preferred embodiment thereof which is illustrated in the accompanying drawings.

Figure 1:
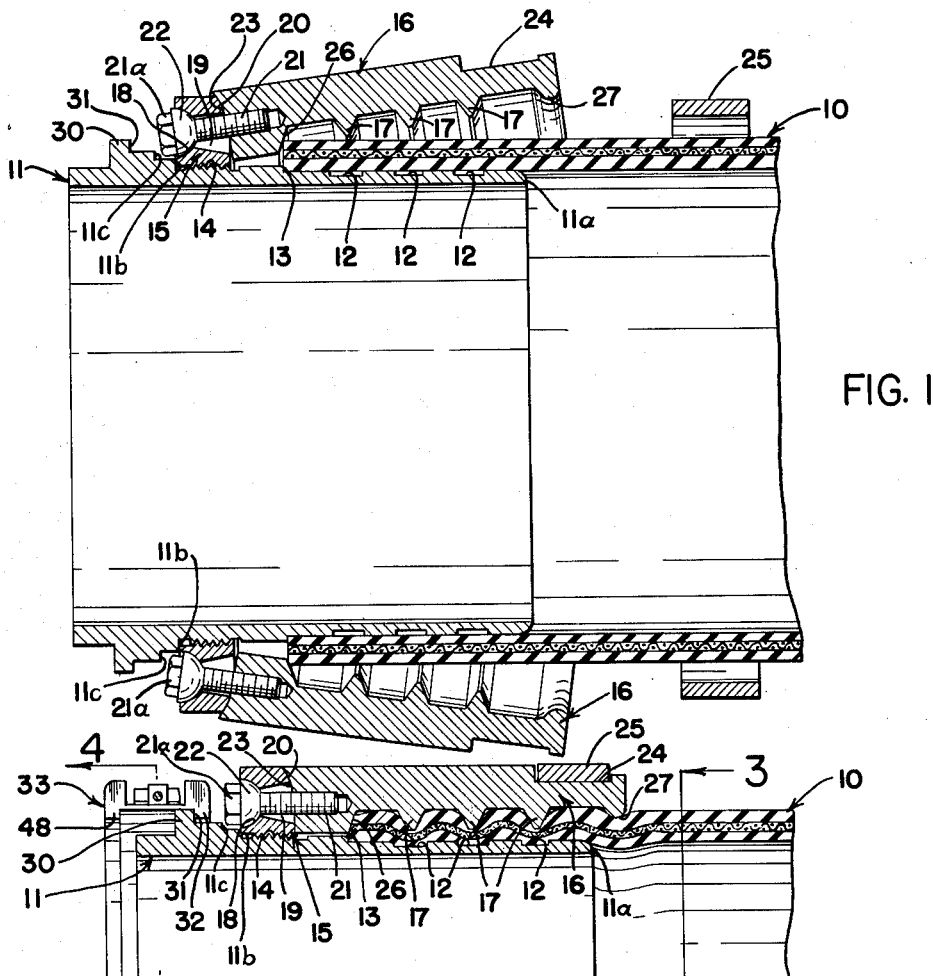
FIGURE 1 is an axial section through the present hose clamp and the hose before the clamp is fully assembled on the hose.

Referring to the drawings, the hose clamp of the present invention is shown in conjunction with a cylindrical hose 10 of fabric-reinforced rubber or other suitable material.

The present hose clamp comprises a generally tubular, rigid, metal insert 11 which is shaped and dimensioned to be inserted into the open end of the hose 10. In the particular embodiment illustrated, the inner end of the insert is formed with a plurality of axially spaced, annular grooves 12 in its periphery. The insert 11 presents an inwardly facing, annular, external shoulder 13 which is positioned to be engaged by the end face of the hose 10 so as to limit the extent to which the insert can be inserted into the hose. A short distance axially outward beyond this shoulder 13 the insert 11 is formed with an externally screw-threaded circumferential portion 14.

Figure 2:
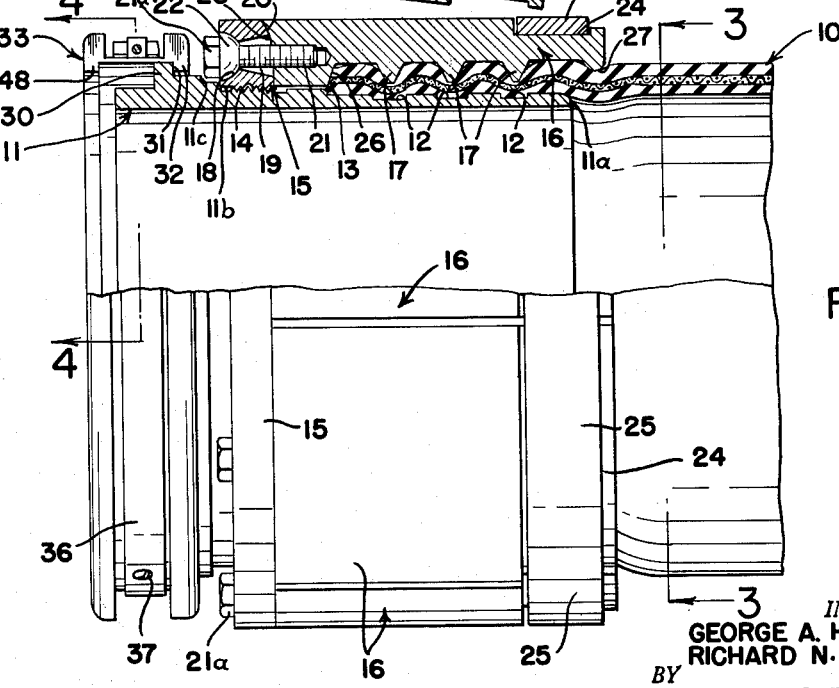
FIGURE 2 is a similar view showing the clamp fully assembled on the hose.
Figure 3:
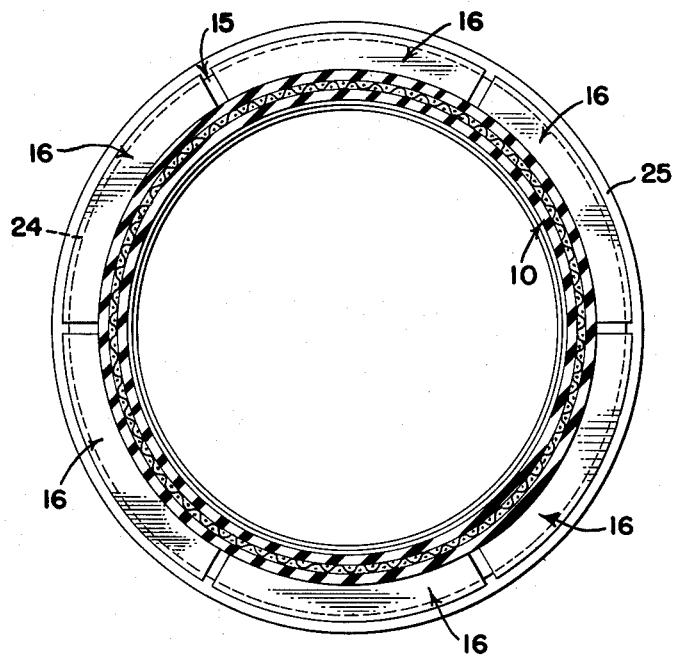
FIGURE 3 is a view taken along the line 3—3 in FIGURE 2 showing the hose in cross-section and the clamp in end elevation.
Figure 5:
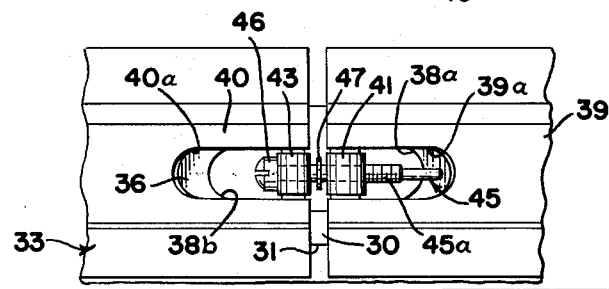
FIG. 5 is a fragmentary plan view taken from the line 5—5 in FIG. 4 and showing the adjusting mechanism in the split ring fastener.

An internally threaded mounting ring 15 is threadedly mounted on the screw-threaded portion 14 of the insert 11. This ring 15 provides a physical support for a plurality of individual outside clamping segments 16 which are generally arcuate in cross section. In the particular embodiment illustrated in the drawing there are six such clamping segments, although the number may be varied as desired. As best seen in FIGS. 1 and 2, each of these outside clamping segments is formed with a plurality of axially spaced, radially inwardly projecting sharp teeth 17 which are positioned to engage and bite into the ouside of the hose 10 opposite the grooves 12 in the insert 11.

The mounting ring 15 is formed with a plurality of circumferentially spaced openings which correspond in number to the number of the clamping segments 16 and which positively determine the respective positions of the clamping segments 16 circumferentially around the hose. As best seen in FIGS. 1 and 2, each of these openings defines a spherical seat 18 which faces axially outwardly away from the end of the hose 10. An inwardly extending passage 19 intersects this spherical seat at the middle and extends therefrom toward the end of the hose, being of progressively larger cross sectional size toward the hose. The inner end face of the mounting ring 15 is rounded at 20 toward its radially outward edge.

A bolt 21 is threadedly received in the outer end of each clamping segment 16. This bolt carries an enlarged rounded portion 22 having a spherical surface slidable on the spherical seat 18 on the mounting ring 15 to provide a ball and socket connection with the mounting ring. The diameter of the shank of the bolt 21 is substantially smaller than the radial depth of the passage 19 in the mounting ring 15, so that each bolt can move a limited amount radially inward or outward to bring the corresponding clamping segment 16 into or out of engagement with the hose 10.

The back or outer end of each clamping segment 16 is formed with a rounded end face 23 which rides over the rounded face 20 on the mounting ring 15 when the clamping segment is moved pivotally in either direction, either inward toward the hose or outward away from the hose.

Near its opposite, free end each arcuate clamping segment is formed with a shallow peripheral groove 24 for receiving a retaining ring 25 which encircles all of the clamping segments 16 and holds them tight against the hose, as shown in FIG. 2, when the clamp is fully assembled on the hose.

Near its attached end each clamping segment presents an inclined internal surface 26, which tapers toward the hose in a radially outward direction and which is positioned to be engaged by the end of the hose when the latter expands lengthwise slightly due to the application of the clamping pressure.

At its free end each clamping segment is formed with a radially inwardly protruding, rounded tooth 27 which is disposed a short distance axially beyond the inner end 11a of the insert 11 and which pinches the hose radially inward, as shown in FIG. 2, so that just beyond the inner end of the insert 11 the internal diameter of the hose is almost as small as the internal diameter of the insert 11.

In the particular embodiment shown in FIGS. 2–5 the present hose clamp is provided with a split-ring arrangement for attaching it to a female fitting.

Referring to FIG. 2 the insert 11 in the present clamp is formed with an external, radially outwardly projecting, annular flange 30 spaced axially outward beyond the head ends of the respective bolts 21. This flange 30 provides an axially inwardly-facing shoulder 31 for engagement by a radially inwardly protruding flange 32 on a split ring 33.

Figure 4:
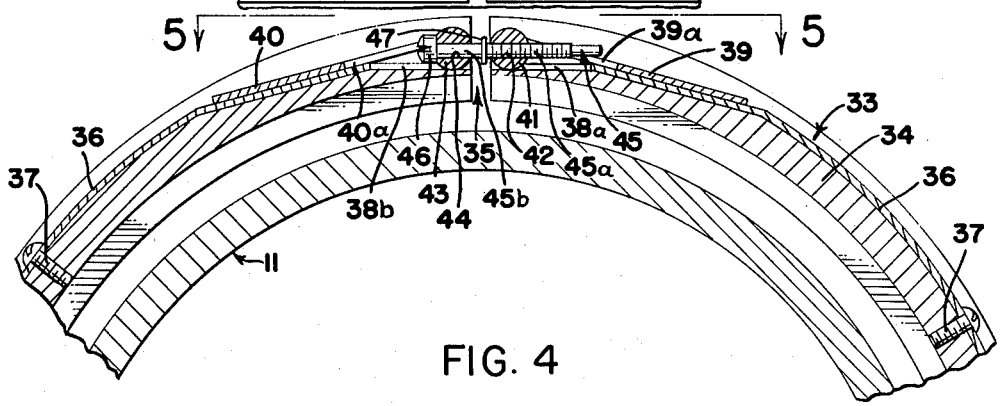
FIGURE 4 is a section taken along the line 4—4 in FIGURE 2 and showing part of the split ring fastener for attaching the present hose clamp to a fitting.

As shown in FIG. 4, the split ring 33 comprises a relatively thick annular, cast metal body 34, formed with a radial gap 35 in its upper end, and a thin metal strap 36 attached to the outside of the body 34 by bolts 37. In the vicinity of the gap 35 the split ring body 34 is flattened on the outside.

At both sides of the gap 35 the strap 36 is formed with slots 38a and 38b. A short flat strap member 39 is rigidly attached to the outside of strap 36 at one side of the gap and is bifurcated to provide a slot 39a which registers with slot 38a. As best seen in FIG. 4, in a direction toward the radial gap 35 the bifurcated portion of strap member 39 diverges from the slotted end of strap 36.

An identical strap member 40 having a slot 40a therein is attached to strap 36 at the opposite side of the gap 35 in the same manner.

A first cylindrical piece 41 is attached fixedly to the strap members 36 and 39 and is disposed within the slotted ends of these strap members on one side of the gap 35. This piece is formed with a screw-threaded bore 42.

A similar piece 43 is carried by the strap members 36 and 40 at the opposite side of the gap 35 and is formed with a smooth-walled bore 44 aligned with the screw-threaded bore 42.

A clamping bolt 45 has a screw-threaded shank portion 45a threadedly received in the screw-threaded bore 42 in the piece 41 and a smooth shank portion 45b received in the bore 44. The bolt 45 has a head 46, provided with a screw-driver slot, which engages the outside of the piece 43. The bolt also carries a collar 47 which is positioned to engage the inside of the piece 42 to thereby limit the extent to which the bolt can be turned to tighten the split ring.

With this arrangement the split ring 33 can be slipped over the flange 30 on the hose clamp when the gap 35 is wide enough to permit such action to take place. Then the bolt 45 may be turned by means of a screw driver to tighten the split ring on the insert 11.

As shown in FIG. 2, the split ring at its outer end presents an annular, radially inwardly projecting flange 48 for engagement with a shoulder on a female fitting (not shown) to hold the insert 11 in the present hose clamp assembled to such fitting.

In the assembly of the hose clamp onto the hose, the several arcuate clamping segments 16 are pivotally attached by the bolts 21 to the mounting ring 15. It will be apparent that the respective pivotal mountings for the clamping segments 16 position them in a positive manner on ring 15, so that they are uniformly distributed circumferentially around the axis of the mounting ring. Then the mounting ring 15 is threadedly mounted onto the insert 11. The insert 11 presents an external annular shoulder 11b against which the outer end of ring 15 abuts when fully threaded onto the insert. With this arrangement the arcuate clamping segments are positively located in the proper position lengthwise with respect to the insert 11 so as to coact therewith in clamping the hose in the desired manner.

After the ring 15 has been threaded onto the insert 11, the insert, ring and clamping segments 16 may be handled as a unit. The only remaining part of the hose clamp is the retaining ring 25. The insert 11 presents a further external annular shoulder 11c located just beyond the heads 21a on the outer ends of the respective bolts 21 which pivotally connect the arcuate clamping segments 16 to the mounting ring 15. This shoulder prevents the withdrawal of any of these bolts from the respective clamping segment 16 or ring 15 as long as ring 15 is mounted on the insert 11.

With the clamping segments 16 spread apart from the inner end of the insert 11, the insert 11 is inserted into the end of the hose 10, with the parts of the hose clamp being more or less in the position shown in FIG. 1.

Then the several arcuate clamping segments 16 are pivoted inward until they contact the outside of the hose 10, at which time they are forced in against the hose a sufficient amount to permit the retaining ring 25 to be slipped over the free ends of the clamping segments and into the grooves 24. When the inward pressure on the clamping segments is removed, the resiliency of the material of the hose will force the free ends of the clamping segments outward a sufficient amount for the retaining ring 25 to be positively maintained in place in the grooves 24.

The hose clamp may be removed from the hose readily, simply by reversing the sequence of the foregoing steps used during assembly.

As shown in FIG. 2, the teeth 17 on the clamping segments force the hose material radially inward, forcing it into the external grooves 12 in the insert 11 in the usual manner.

In the assembled position of the clamp, as shown in FIG. 2, the presence of the inwardly protruding rounded teeth 27 on the free ends of the clamping segments 16 reduces the tensile force which is transmitted by the hose to the sharp teeth 17 due to internal pressure in the hose and/or a tensile pull lengthwise on the hose. That is, the tensile force applied to each sharp tooth 17 is less than it would be in the absence of the rounded teeth 27. These rounded teeth 27 exert a frictional drag on the hose so that all of the force tending to pull the hose free from the clamp is not required to be taken up by the sharp teeth 17. As a result, the tendency for the clamp to tear the hose carcass is greatly reduced, as compared with previous toothed hose clamps.

From the foregoing it will be apparent that the particular hose clamp shown in the accompanying drawing and described in detail herein is particularly well suited for the accomplishment of the stated purposes of this invention. However, it is to be understood that various modifications, omissions and refinements which depart from the disclosed embodiment may be adopted without departing from the spirit and scope of this invention.

What is claimed is:

1. In a hose clamp, a mounting ring having a plurality of circumferentially spaced openings extending lengthwise therethrough, a plurality of circumferentially arranged clamping segments at one side of said ring for engagement with the outside of a hose, a plurality of attachment members each having a portion bearing against the mounting ring and extending therefrom through the respective opening in the mounting ring and having a connection to the respective clamping segment, each of said attachment members being adjustable pivotally with respect to the mounting ring in a direction radially of the latter for selective adjustment of the respective clamping segment into or out of engagement with the hose, and said connection between each attachment member and the respective clamping segment being a screw-threaded connection for selectively tightening the clamping segment endwise against the ring.

2. In a hose clamp, an internally screw-threaded mounting ring having a plurality of circumferentially spaced openings extending lengthwise therethrough, a plurality of clamping segments at one side of said ring arranged in succession circumferentially and having clamping portions at the inside for engagement with the outside of a hose, said ring providing a concave seat at each of said openings at the opposite side of the ring, a plurality of attachment bolts extending through said openings and each having a convex enlargement bearing against the respective concave seat at the respective opening, each of said bolts having a shank with a clearance in the respective opening which permits pivotal movement of the bolt with respect to the mounting ring in a direction radially of the latter, and each bolt shank having a screw-threaded connection to the respective clamping segment at said one side of the ring.

3. The clamp of claim 2, wherein said one side of mounting ring has a rounded surface adjacent its radially outward edge, and each clamping segment has a complementary concave surface for engagement with said rounded surface to constrain the clamping segment to movement pivotally toward and away from the hose.

4. A hose clamp comprising an annular rigid insert having an end for insertion into a hose, a mounting ring threadedly mounted on the outside of said insert away from the latter's insertion end, said mounting ring having a plurality of circumferentially spaced openings extending lengthwise therethrough, a plurality of rigid arcuate clamping segments disposed at the side of the ring toward the insertion end of the insert and arranged in succession circumferentially, each of said clamping segments having teeth at the inside for biting engagement with the outside of a hose and a rounded internal protrusion which is disposed axially beyond the insertion end of the insert to engage the hose thereat, said ring providing a spherical seat at each of said openings at the opposite side of the ring, a plurality of attachment bolts extending through said openings and each having a spherical enlargement bearing against the respective spherical seat at the respective opening, each of said bolts having a clearance in the respective opening which permits pivotal movement of the bolt on the respective seat in a direction radially of the mounting ring, each bolt shank having a screw-threaded connection to the respective clamping segment at said one side of the ring for tightening the clamping segment against the ring, said one side of the mounting ring having a rounded surface adjacent its radially outward edge, and each clamping segment having a complementary concave surface for engagement with said rounded surface to constrain the clamping segment to movement pivotally toward and away from the hose.

References Cited in the file of this patent

UNITED STATES PATENTS

| 767,893 | Jewell | Aug. 16, 1904 |
| 1,235,876 | Cave | Aug. 7, 1917 |
| 2,619,010 | Mathieson | Nov. 25, 1952 |

FOREIGN PATENTS

| 1,221,079 | France | Jan. 11, 1960 |